(12) United States Patent
Yanaga et al.

(10) Patent No.: US 11,732,376 B2
(45) Date of Patent: Aug. 22, 2023

(54) ROUGHENED PLATED SHEET

(71) Applicant: TOYO KOHAN CO., LTD., Tokyo (JP)

(72) Inventors: Hiroki Yanaga, Kudamatsu (JP); Shinichirou Horie, Kudamatsu (JP); Etsuro Tsutsumi, Kudamatsu (JP); Masashi Ichishima, Kudamatsu (JP); Toshifumi Koyanagi, Kudamatsu (JP); Koh Yoshioka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 17/596,362

(22) PCT Filed: Jun. 10, 2020

(86) PCT No.: PCT/JP2020/022910
§ 371 (c)(1),
(2) Date: Dec. 8, 2021

(87) PCT Pub. No.: WO2020/250946
PCT Pub. Date: Dec. 17, 2020

(65) Prior Publication Data
US 2022/0235483 A1     Jul. 28, 2022

(30) Foreign Application Priority Data

Jun. 12, 2019   (JP) ................................ 2019-109246

(51) Int. Cl.
| | |
|---|---|
| *B32B 15/01* | (2006.01) |
| *C25D 5/16* | (2006.01) |
| *C25D 5/12* | (2006.01) |

(52) U.S. Cl.
CPC .............. *C25D 5/16* (2013.01); *B32B 15/013* (2013.01); *B32B 15/017* (2013.01); *C25D 5/12* (2013.01); *B32B 2307/538* (2013.01)

(58) Field of Classification Search
None
See application file for complete search history.

(56) References Cited

U.S. PATENT DOCUMENTS

| | | | |
|---|---|---|---|
| 7,108,923 B1 | 9/2006 | Ito et al. | |
| 9,504,149 B2 * | 11/2016 | Arai | ........................ B32B 15/08 |

(Continued)

FOREIGN PATENT DOCUMENTS

| | | |
|---|---|---|
| CN | 1657279 A | 8/2005 |
| CN | 1867229 A | 11/2006 |

(Continued)

OTHER PUBLICATIONS

International Search Report for PCT/JP2020/022910, dated Sep. 1, 2020.

(Continued)

*Primary Examiner* — Daniel J. Schleis
(74) *Attorney, Agent, or Firm* — Sughrue Mion, PLLC

(57) ABSTRACT

Provided is a roughened plated sheet comprising a roughened plated layer having a roughened nickel plated layer and a zinc plated layer formed on at least one surface of a metal substrate in this order from the metal substrate side, wherein a ten-point average roughness $Rz_{jis}$ of a surface of the roughened plated layer, according to laser microscope measurement, is 3 μm or more.

6 Claims, 6 Drawing Sheets

(56) References Cited

U.S. PATENT DOCUMENTS

| | | | |
|---|---|---|---|
| 9,724,896 B2* | 8/2017 | Momoi | B32B 15/08 |
| 2005/0175826 A1 | 8/2005 | Suzuki | |
| 2011/0008644 A1 | 1/2011 | Naritomi et al. | |
| 2012/0111613 A1 | 5/2012 | Oguro et al. | |
| 2014/0305903 A1 | 10/2014 | Naritomi et al. | |
| 2015/0111057 A1 | 4/2015 | Taya et al. | |
| 2016/0120017 A1 | 4/2016 | Momoi et al. | |
| 2017/0291397 A1 | 10/2017 | Momoi et al. | |

FOREIGN PATENT DOCUMENTS

| | | |
|---|---|---|
| CN | 102471913 A | 5/2012 |
| CN | 105555012 A | 5/2016 |
| JP | 2005-248323 A | 9/2005 |
| JP | 2011-021216 A | 2/2011 |
| JP | 2011-162860 A | 8/2011 |
| JP | 2013-095991 A | 5/2013 |
| JP | 5885345 B2 | 3/2016 |
| JP | 2016-065266 A | 4/2016 |
| JP | 2016-084528 A | 5/2016 |
| WO | 2009/116484 A1 | 9/2009 |
| WO | 2016/038923 A1 | 3/2016 |

OTHER PUBLICATIONS

Notification of Reasons for Refusal dated Mar. 18, 2023 from the Chinese Patent Office in corresponding application No. 202080042035.5.

* cited by examiner

ROUGHENED PLATED SHEET

CROSS-REFERENCE TO RELATED APPLICATIONS

This application is a National Stage of International Application No. PCT/JP2020/022910 filed Jun. 10, 2020, claiming priority based on Japanese Patent Application No. 2019-109246 filed Jun. 12, 2019.

TECHNICAL FIELD

The present invention relates to a roughened plated sheet having excellent corrosion resistance and exhibiting excellent adhesiveness to other members.

BACKGROUND ART

Copper plated steel sheets, nickel plated steel sheets, copper sheets and nickel sheets have been conventionally used as members constituting batteries or members constituting electronic equipment. In particular, nickel plated steel sheets and nickel sheets have been widely used from the viewpoint of corrosion resistance, and nickel plated steel sheets have been suitably used in terms of cost. There are known methods for controlling surface structures from the viewpoint that adhesiveness is enhanced in the case of joining with other members.

For example, Patent Document 1 discloses a surface-treated steel sheet obtained by forming on a steel sheet a nickel plated layer having a fine structure controlled at a particle density of 2 to 500/m$^2$ and an average particle size of 0.05 to 0.7 μm.

Patent Document 2 discloses surface-treated copper foil obtained by forming on copper raw foil, an underlying nickel plated layer, a roughened copper plated layer including copper crystal roughened particles, and a zinc plated layer, as surface-treated copper foil for forming a copper clad laminate by bonding together with a resin film. Furthermore, Patent Document 3 discloses a joined product of a zinc-based galvanized steel sheet having ultrafine irregularities, and an adherend including a resin formed article of a thermoplastic resin composition mainly containing one or more selected from polybutylene terephthalate, polyphenylene sulfide and aromatic polyamide.

RELATED ART

Patent Documents

Patent Document 1: Japanese Patent No. 5885345
Patent Document 2: Japanese Patent Laid-Open No. 2016-65266
Patent Document 3: International Publication No. WO 2009/116484

SUMMARY OF THE INVENTION

Problem to be Solved by the Invention

However, the surface-treated steel sheet disclosed in Patent Document 1 described above may be sometimes insufficient in adhesiveness to other members depending on the types of members joined to the surface-treated steel sheet and the joining method, and there has been a demand for a further enhancement in adhesiveness.

The surface-treated steel sheet disclosed in Patent Document 1 described above has the outermost surface formed fro nickel, and thus also has the problem of not being sufficient in corrosion resistance (in particular, salt damage resistance and pitting corrosion resistance).

The surface-treated copper foil disclosed in Patent Document 2, in which a zinc plated layer is formed on a layer plated with copper electrochemically noble as compared with nickel, thus has the problem of causing zinc to be easily dissolved from the zinc plated layer and not being sufficient in corrosion resistance.

The technique disclosed in Patent Document 3 described above not only requires etching to be performed after zinc plating and causes a complicated production process, but also requires a long time for etching and thus has the problem of being inferior in production efficiency.

An object of the present invention is to provide a roughened plated sheet having excellent corrosion resistance and exhibiting excellent adhesiveness to other members.

Means for Solving the Problem

The present inventors have made intensive studies in order to achieve the above object, and as a result, have found that the above object can be achieved by forming a roughened plated layer obtained by forming a roughened nickel plated layer and a zinc plated layer in the listed order on a metal substrate, and controlling the ten-point average roughness $Rz_{jis}$ of a surface of the roughened plated layer in a predetermined range, leading to completion of the present invention.

Specifically, the present invention provides a roughened plated sheet comprising a roughened plated layer having a roughened nickel plated layer and a zinc plated layer formed on at least one surface of a metal substrate in this order from the metal substrate side, wherein a ten-point average roughness $Rz_{jis}$ of a surface of the roughened plated layer, according to laser microscope measurement, is 3 μm or more.

In the roughened plated sheet of the present invention, a lightness L* of a surface of the roughened plated layer is preferably 83 or less.

In the roughened plated sheet of the present invention, a ten-point average roughness $Rz_{jis}$ of a surface of the roughened plated layer is preferably 3 to 30 μm.

In the roughened plated sheet of the present invention, a lightness L* of a surface of the roughened plated layer is preferably 45 to 83.

The roughened plated sheet of the present invention preferably further includes another plated layer between the metal substrate and the roughened nickel plated layer.

In the roughened plated sheet of the present invention, the another plated layer is preferably a nickel plated layer or a zinc plated layer.

In the roughened plated sheet of the present invention, an adhesion amount of the zinc plated layer forming the roughened plated layer is 3 g/m$^2$ or more.

In the roughened plated sheet of the present invention, the metal substrate is preferably a metal sheet or metal foil including one pure metal selected from Fe, Cu, Al and Ni, or a metal sheet or metal foil including an alloy including one selected from Fe, Cu, Al and Ni.

Effects of the Invention

According to the present invention, a roughened plated sheet having excellent corrosion resistance and exhibiting excellent adhesiveness to other members can be provided.

DESCRIPTION OF EMBODIMENTS

Figure 1:
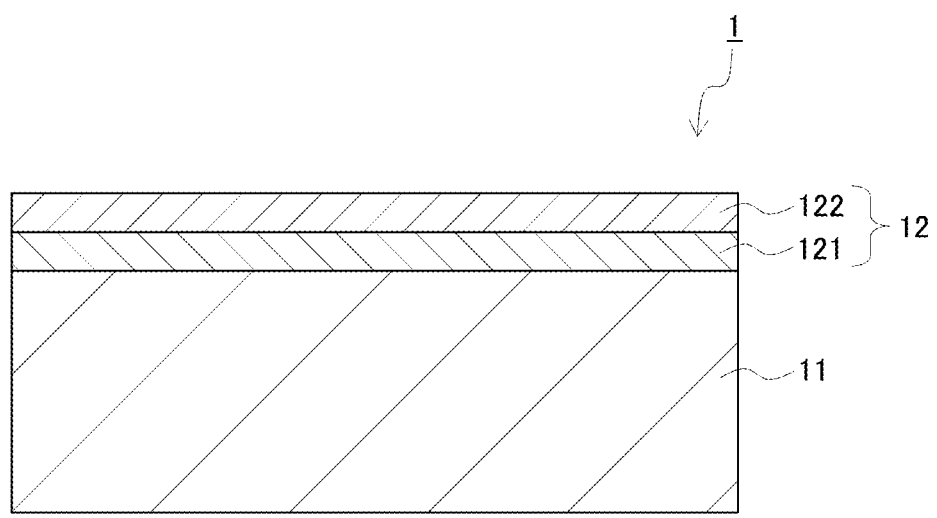
FIG. 1 is a configuration view of a roughened plated sheet according to the present embodiment.

FIG. 1 is a view illustrating the configuration of a roughened plated sheet 1 of the present embodiment. As illustrated in FIG. 1, the roughened plated sheet 1 of the present embodiment has a roughened plated layer 12 obtained by forming on a metal substrate 11, a roughened nickel plated layer 121 and a zinc plated layer 122 in the listed order.

The roughened plated sheet 1 obtained by forming the roughened plated layer 12 formed from the roughened nickel plated layer 121 and the zinc plated layer 122 on one surface of the metal substrate 11 is exemplified in the present embodiment, but is not particularly limited to the embodiment, and the roughened plated layer 12 formed from the roughened nickel plated layer 121 and the zinc plated layer 122 may also be formed on each of both surfaces of the metal substrate 11.

<Metal Substrate 11>

The metal substrate 11 serving as a base sheet of the plated sheet 1 of the present embodiment is not particularly limited, examples thereof include a metal sheet or metal foil including one pure metal selected from Fe, Cu, Al and Ni, or a metal sheet or metal foil including an alloy including one selected from Fe, Cu, Al and Ni, or the like, specific examples thereof include a steel sheet, a stainless steel sheet, a copper sheet, an aluminum sheet, or a nickel sheet (each may be any of a pure metal and an alloy, or may be in the form of foil.), or the like, among then, a steel sheet is preferable from the viewpoints that plating is easily applied even if a pre-treatment of plating processing is a relatively easy pre-treatment, and that the effect of enhancing adhesiveness to the metal substrate can be more increased by formation of the roughened nickel plated layer 121 and the zinc plated layer 122, and in particular, a low carbon aluminum-killed steel (where the amount of carbon is 0.01 to 0.15% by weight), an ultra-low carbon steel having an amount of carbon of 0.01% by weight or less (preferably an amount of carbon of 0.003% by weight or less), or a non-aging ultra-low carbon steel obtained by adding Ti, Nb and/or the like to an ultra-low carbon steel is suitably used.

In the present embodiment, a steel sheet, a stainless steel sheet, a copper sheet, an aluminum sheet or a nickel sheet, obtained by subjecting a hot-rolled sheet of the metal substrate to washing with acid for removal of scale (oxide film) on a surface, thereafter cold-rolling and then electrolytic washing off of rolling oil can be used as a base sheet. One subjected to annealing or temper rolling after electrolytic washing off may also be used. The annealing here may be either continuous annealing or box annealing, and is not particularly limited. Alternatively, copper foil, nickel foil or the like, as an electrolytic foil or a metal sheet produced by an electroforming method or the like, can be used as the metal substrate.

In a case where the metal substrate 11 used is a metal substrate where a passivation film is formed on a stainless steel sheet, a nickel sheet or the like, one may be used which is subjected to strike nickel plating before roughened nickel plating for formation of the roughened nickel plated layer 121 or before plating processing for formation of an underlying metal plated layer to be optionally formed. Conditions of the strike nickel plating are not particularly limited, and examples include the following conditions. The adhesion amount of nickel by the strike nickel plating in the following conditions is usually 0.08 to 0.89 g/m$^2$, and in a case where an underlying nickel layer is formed as the underlying metal plated layer, the total amount of the adhesion amount of nickel by the strike nickel plating and the adhesion amount of nickel by nickel plating for formation of the underlying nickel layer is measured as the adhesion amount of nickel of the underlying nickel layer.

Bath composition: 100 to 300 g/L of nickel sulfate hexahydrate, 10 to 200 g/L of sulfuric acid
pH: 1.0 or less
Bath temperature: 40 to 70° C.
Current density: 5 to 100 A/dm$^2$
Plating time: 3 to 100 seconds The thickness of the metal substrate 11 is not particularly limited, and is preferably 0.01 to 2.0 mm, more preferably 0.025 to 1.6 mm, further preferably 0.025 to 0.3 mm. The roughness of the metal substrate 11 is not particularly limited, and the arithmetic average roughness Ra with a stylus type surface roughness meter is 0.05 to 2.0 μm, more preferably 0.05 to 0.9 μm, further preferably 0.05 to 0.5 μm.

<Roughened Plated Layer 12 (Roughened Nickel Plated Layer 121 and Zinc Plated Layer 122)>

The roughened plated sheet 1 of the present embodiment includes the roughened plated layer 12 formed from the roughened nickel plated layer 121 and the zinc plated layer 122 on the metal substrate 11, as illustrated in FIG. 1.

In the present embodiment, the ten-point average roughness $Rz_{jis}$ of a surface of the roughened plated layer 12 formed from the roughened nickel plated layer 121 and the zinc plated layer 122, according to laser microscope measurement, is controlled to be 3 μm or more. According to the present embodiment, the roughened plated layer 12 can be one where the zinc plated layer 122 is formed on the roughened nickel plated layer 121, to thereby impart excellent corrosion resistance (in particular, salt damage resistance and pitting corrosion resistance) by the zinc plated layer 122, thereby allowing the roughened plated sheet 1 to be excellent in corrosion resistance, and furthermore, the ten-point average roughness $Rz_{jis}$ of a surface of the roughened plated layer 12, according to laser microscope measurement, can be in the range of 3 μm or more, to thereby allow the roughened plated sheet 1 to be excellent in adhesiveness to other members. In particular, according to the present embodiment, the roughened nickel plated layer 121 and the zinc plated layer 122 are combined to thereby hardly cause the zinc plated layer 122 to be eluted because the standard electrode potential of nickel is closer to that of zinc than those of copper and the like, and thus the effect of enhancing corrosion resistance of zinc can be sufficiently exerted and therefore excellent corrosion resistance can be realized.

When the roughened nickel plated layer 121 and the zinc plated layer (which may be either an underlying zinc plated layer as an underlying metal layer 13 described below, or the zinc plated layer 121 forming the roughened plated layer 12) co-exist on a surface of the roughened plated sheet 1, blackening by an oxidation reaction, of a zinc surface, occurs due to the difference in potential between nickel and zinc under an environment of use of the roughened plated sheet 1 (for example, under a corrosive environment), resulting in formation of a black zinc oxide. According to findings of the present inventors, it has been confirmed that the black zinc oxide is excellent in corrosion resistance as compared with white rust (hydroxide of white zinc and oxide of zinc) generated in the case of a layer configuration of a single zinc plate. While a mechanism of an enhancement in corrosion resistance of the black zinc oxide is not necessarily clear, it is considered that the effect of enhancing corrosion resistance, for example, slowing the occurrence of red rust is exerted by the exertion of the effect of slowing the dissolution of zinc due to formation of a black oxide on the zinc surface, the effect of enabling sacrificial anticorrosion action of zinc to slowly progress, and the like, for example, in the case of use of a steel sheet or the like as the metal substrate 11.

Figure 2:
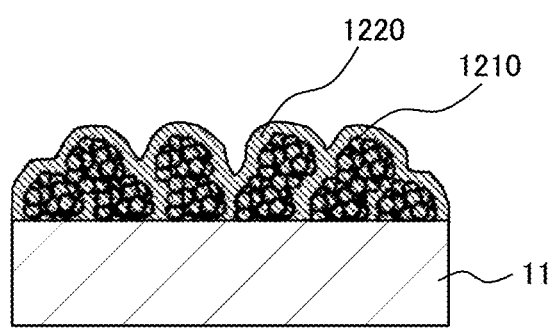
FIG. 2 is a schematic view illustrating a detail structure of a roughened nickel plated layer and a zinc plated layer forming a roughened plated sheet according to one embodiment of the present invention.

The method for allowing the ten-point average roughness $Rz_{jis}$ of a surface of the roughened plated layer 12 to be 3 μm or more in the present embodiment is not particularly limited, and is suitably, for example, a method for allowing the roughened plated layer 12 to have a detailed structure as illustrated in FIG. 2. FIG. 2 is a schematic view illustrating a detailed structure of a roughened plated layer 12 configured from a roughened nickel plated layer 121 and a zinc plated layer 122, according to one embodiment of the present invention. As illustrated in FIG. 2, the roughened plated layer 12 according to one embodiment of the present invention is obtained by forming a layer configured from a plurality of nickel particulate materials 1210, as the roughened nickel plated layer 121, and a zinc plated film 1220 (namely, zinc plated layer 122) on the roughened nickel plated layer 121 including the plurality of nickel particulate materials 1210 so that the plurality of nickel particulate materials 1210 are covered.

The ten-point average roughness $Rz_{jis}$ of a surface of the roughened plated layer 12, according to laser microscope measurement, may be in the range of 3 μm or more, and the ten-point average roughness $Rz_{jis}$ is preferably 3 to 30 μm, more preferably 4 to 15 μm, further preferably 5 to 10 μm. If the ten-point average roughness $Rz_{jis}$ is less than 3 μm, roughening is insufficient and no adhesiveness to other members can be ensured. On the other hand, if the ten-point average roughness $Rz_{jis}$ is more than 30 μm, adhesiveness of the roughened plated layer to the metal substrate tends to be deteriorated.

The ten-point average roughness $Rz_{jis}$ of the roughened plated layer 12 may be in the above range, and the arithmetic average roughness Ra of a surface of the roughened plated layer 12, according to laser microscope measurement, is preferably 0.2 to 3.5 μm, more preferably 0.4 to 2.0 μm, further preferably 0.4 to 1.1 μm. If the arithmetic average roughness Ra is less than 0.2 μm, roughening is insufficient and no adhesiveness to other members can be sometimes endured. On the other hand, if the arithmetic average roughness Ra is more than 3.5 μm, adhesiveness of the roughened plated layer to the metal substrate may be sometimes deteriorated.

The lightness of a surface of the roughened plated layer 12, as the L* value of the roughened plated layer 12, is preferably 83 or less, more preferably 45 to 83, further preferably 53 to 70, particularly preferably 58 to 70. The lightness L* is in the above range, and thus the roughened plated sheet 1 can be more excellent in adhesiveness to other members.

The glossiness at 85° of a surface of the roughened plated layer 12 is preferably 0.3 to 83, more preferably 1 to 60, further preferably 1 to 35, particularly preferably 4 to 35.

The reason why the present embodiment focuses on not only the ten-point average roughness $Rz_{jis}$, but also the lightness L* and the glossiness at 85°, is as follows.

For example, in a case where the roughened plated layer 12 has a detailed structure as illustrated in FIG. 2, aggregates of protrusions (columns), including secondary particles (nickel particulate materials 1210) of primary particles aggregated, and the zinc plated film 1220 (namely, zinc plated layer 122) are formed. It has been then found according to findings of the present inventors that, for example, such a structure cannot allow any resin to enter such protrusions and allow adhesiveness to be sometimes ensured if the density of the roughened plated layer 12 is too high, causes such each aggregate to be thin and easily broken to possibly result in deterioration in adhesiveness of the roughened plated layer 12 to the metal substrate 11 if the density is too low, and furthermore causes such an aggregate by itself to be so few that the anchor effect is not necessarily sufficient and no sufficient effect of enhancing adhesiveness to other members may be sometimes obtained.

The present inventors have made further studies under such a circumstance, thus have focused on not only the ten-point average roughness $Rz_{jis}$ but also the lightness L* and also the glossiness at 85° of the roughened plated layer 12, as parameters associated with the size, the shape and the density of the roughened plated layer 12, and have found that such parameters can be in specified ranges to thereby result in further enhancements in adhesiveness to other members and in adhesiveness of the roughened plated layer 12 by itself.

In the present embodiment, the lightness L* is preferably in the above range, and if the lightness L* is too high, the density of the roughened plated layer is high not to enable any other members such as a resin to enter such protrusions and not to sometimes enable adhesiveness to other members to be ensured. If the glossiness at 85° is less than 0.3, the density of the roughened plated layer is low and each aggregation is thin and easily broken, sometimes resulting in deterioration in adhesiveness of the roughened plated layer to the metal substrate. On the other hand, if the glossiness at 85° is more than 83, the density of the roughened plated layer is high not to enable any other members such as a resin to enter such protrusions and not to sometimes enable adhesiveness to other members to be ensured.

The arithmetic average roughness Ra of a surface of the roughened plated layer 12 is preferably 1.1 μm or less and the lightness of a surface of the roughened plated layer 12, as the L* value, is preferably 58 or more from the viewpoint that adhesiveness of the roughened plated layer 12 by itself (adhesiveness of the roughened plated layer 12 to the metal substrate 11) can be more enhanced. Thus, the roughened plated layer 12 by itself can be more enhanced in adhesiveness (adhesiveness of the roughened plated layer 12 to the metal substrate 11) and thus can be more enhanced in reliability and stability when used with adhering to other members.

The adhesion amount of the roughened nickel plated layer 121 forming the roughened plated layer 12 is not particularly limited, and is preferably 0.4 to 14.0 g/m², more preferably 0.8 to 9.0 g/m², further preferably 0.8 to 6.0 g/m². The adhesion amount of the roughened nickel plated layer 121 can be in the above range to thereby allow the roughened plated sheet 1 to be more excellent in adhesiveness to other members.

The adhesion amount of the roughened nickel plated layer 121 can be determined by measuring the total amount of nickel in the obtained roughened plated sheet 1 with a fluorescent X-ray apparatus in a case where no underlying nickel plated layer is formed as an underlying metal plated layer 13 described below, and on the other hand, it can be determined by measuring the total amount of nickel in the obtained roughened plated sheet 1 with a fluorescent X-ray apparatus, and then subtracting the amount of nickel, corresponding to that in an underlying nickel plated layer as an underlying metal plated layer 13 described below, from the total amount of nickel, in a case where the underlying nickel plated layer is formed as an underlying metal plated layer 13. The amount of nickel, corresponding to that in the underlying nickel plated layer as an underlying metal plated layer 13, can be determined by, for example, a method involving cutting the obtained roughened plated sheet 1, and observing a cross section with a scanning electron microscope (SEM) to thereby measure the thickness of the underlying nickel plated layer as an underlying metal plated layer 13 and determine the amount of nickel, converted from the thickness of the underlying nickel plated layer as an underlying metal plated layer 13, a method involving measuring the amount of nickel on a steel sheet in formation of the underlying nickel plated layer as an underlying metal plated layer 13 on the steel sheet, with a fluorescent X-ray apparatus, or a method involving determining the amount of nickel from the amount of electrocrystallization, calculated from the amount of coulomb in formation of the underlying nickel plated layer as an underlying metal plated layer 13 on the steel sheet.

The adhesion amount of the zinc plated layer 122 forming the roughened plated layer 12 is not particularly limited, and is preferably 3 g/m² or more, more preferably 6 g/m² or more, further preferably 6 to 30 g/m², particularly preferably 6 to 21 g/m², from the viewpoint of corrosion resistance. The adhesion amount of the zinc plated layer 122 is in the above range, and thus the roughened plated sheet 1 can be more excellent in adhesiveness to other members.

The adhesion amount of the zinc plated layer 122 can be measured with a fluorescent X-ray apparatus as in the case of the adhesion amount of the roughened nickel plated layer 121, and can be determined depending on the presence of the underlying zinc plated layer as an underlying metal plated layer 13 as in the case of the adhesion amount of the roughened nickel plated layer 121.

In other words, the adhesion amount of the zinc plated layer 122 can be determined by measuring the total amount of zinc in the obtained roughened plated sheet 1 with a fluorescent X-ray apparatus in a case where no underlying zinc plated layer is formed as an underlying metal plated layer 13 described below, and on the other hand, it can be determined by measuring the total amount of zinc in the roughened plated sheet 1 with a fluorescent X-ray apparatus, and then subtracting the amount of zinc, corresponding to that in an underlying nickel plated layer as an underlying metal plated layer 13 described below, from the total amount of zinc, in a case where the underlying zinc plated layer is formed as an underlying metal plated layer 13. The amount of zinc, corresponding to that in the underlying zinc plated layer as an underlying metal plated layer 13, can also be determined by, for example, a method involving measuring the thickness of the underlying zinc plated layer from observation of a cross section, and performing conversion, a method involving measuring the amount of zinc in formation of the underlying zinc plated layer, or a method of calculation from the amount of coulomb in formation of the underlying zinc plated layer, as in the case of determining the amount of nickel corresponding to that in the underlying nickel plated layer.

The ratio between the adhesion amount of the roughened nickel plated layer 121 and the adhesion amount of the zinc plated layer 122 is not particularly limited, and is preferably 0.4 to 0.87, more preferably 0.55 to 0.87, further preferably 0.65 to 0.87 as the ratio of "adhesion amount of zinc plated layer 122/(adhesion amount of roughened nickel plated layer 121+adhesion amount of zinc plated layer 122)" (namely, "Zn/(Ni+Zn)"), from the viewpoint of a more enhancement in adhesiveness to other members.

Figure 3:
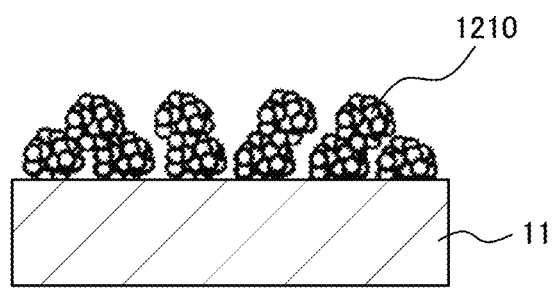
FIG. 3 is a schematic view for describing one example of a method for producing a roughened plated sheet according to one embodiment of the present invention.

As described above, a suitable method for allowing the ten-point average roughness $Rz_{jis}$ of a surface of the roughened plated layer 12 to be 3 μm or more is, for example, a method for allowing the roughened plated layer 12 to be one having a detailed structure as illustrated in FIG. 2, and the roughened plated layer 12 having such a mode can be produced by, for example, the following method. In other words, the roughened plated layer 12 having a detailed structure as illustrated in FIG. 2 can be formed by first subjecting the metal substrate 11 to roughened nickel plating to thereby precipitate the nickel particulate materials 1210 aggregated on the metal substrate 11 as illustrated in FIG. 3 and thus form the roughened nickel plated layer 121 formed from the plurality of nickel particulate materials 1210, and next subjecting the metal substrate 11 on which the nickel particulate materials 1210 aggregated are precipitated, to zinc plating, to thereby cover the nickel particulate materials 1210 with the zinc plated film 1220 and thus form the zinc plated layer 122 as the zinc plated film 1220 on the roughened nickel plated layer 121 formed from the plurality of nickel particulate materials 1210.

Conditions of roughened nickel plating for precipitation of the nickel particulate materials 1210 aggregated, in formation of the roughened nickel plated layer 121, are not particularly limited, and a method with electrolytic plating using a plating bath containing nickel sulfate hexahydrate at a concentration of 10 to 100 g/L and ammonium sulfate at a concentration of 1 to 100 g/L is preferable from the viewpoint that the ten-point average roughness $Rz_{jis}$ of a surface of the roughened plated layer 12 can be suitably controlled in the above range. The concentration of nickel sulfate hexahydrate in the plating bath used is preferably 10 to 60 g/L, more preferably 10 to 50 g/L, further preferably 10 to 40 g/L. Herein, nickel chloride hexahydrate may be used instead of nickel sulfate hexahydrate, or nickel chloride hexahydrate and nickel sulfate hexahydrate may be used in combination, as a nickel ion source. In a case where nickel chloride hexahydrate is used, the concentration of nickel chloride hexahydrate is preferably 10 to 60 g/L, more preferably 10 to 50 g/L, further preferably 10 to 40 g/L. Since increases in nickel ion concentration and chlorine ion concentration may hardly impart an appropriate roughened shape so that the ten-point average roughness $Rz_{jis}$ is in a predetermined range, combination use of nickel chloride hexahydrate with nickel sulfate hexahydrate or ammonium chloride needs any attention. In a case where ammonium sulfate is used as an ammonia source in a plating solution, the concentration of ammonium sulfate in the plating bath used is preferably 10 to 50 g/L, more preferably 10 to 45 g/L, further preferably 15 to 40 g/L. Herein, addition of ammonia to such a nickel plating bath may be addition of ammonia water, or addition in the form of a salt such as ammonium sulfate or ammonium chloride, and the ammonia concentration in the plating bath is preferably 0.3 to 30 g/L, more preferably 1 to 20 g/L, further preferably 3 to 15 g/L, particularly preferably 3 to 12 g/L or less.

When the roughened nickel plated layer 121 is formed, the pH of the nickel plating bath in roughened nickel plating for precipitation of the nickel particulate materials 1210 aggregated is preferably 4.0 to 8.0 from the viewpoint that the ten-point average roughness $Rz_{jis}$ of a surface of the roughened plated layer 12 can be more suitably controlled. If the pH is too high, hydrate is formed from a nickel ion in the bath to easily cause plating failures, and thus the upper limit is more preferably 7.5 or less, further preferably 7.0 or less. If the pH is low, bath resistance is reduced, nickel particles forming secondary particles are hardly precipitated, a usual precipitation mode (flat plate) not roughened is easily made and thus the roughened nickel plated layer is hardly formed, and therefore the pH is more preferably 4.5 or more, further preferably 4.8 or more, particularly preferably 5.0 or more.

In a case where roughened nickel plating for precipitation of the nickel particulate materials 1210 aggregated is performed, the current density is preferably 5 to 40 A/dm$^2$ from the viewpoint that the ten-point average roughness $Rz_{jis}$ of a surface of the roughened plated layer 12 can be more suitably controlled. If the current density is high, not only a reduction in precipitation efficiency easily occurs, but also the variation in plating and the variation in control of the surface roughness easily occur in a region of plating processing, and thus the current density is more preferably 30 A/dm$^2$ or less, further preferably 25 A/dm$^2$ or less, particularly preferably 20 A/dm$^2$ or less particularly in order that a wide area of 100 cm$^2$ or more is ensured. If the current density is low, nickel particles forming secondary particles are hardly precipitated, a usual precipitation mode not roughened is easily made and thus the roughened nickel plated layer is hardly formed, and therefore the current density is more preferably 10 A/dm$^2$ or more. In the present embodiment, the current density is preferably controlled depending on, for example, the nickel ion concentration in the nickel plating bath (controlled as nickel sulfate hexahydrate (g/L) in the plating bath in Examples described below), the temperature of the nickel plating bath, the pH of the nickel plating bath, the ammonia concentration in the nickel plating bath, and the halogen atom concentration in the nickel plating bath, from the viewpoint that the ten-point average roughness $Rz_{jis}$ of a surface of the roughened plated layer 12 is more suitably controlled.

The bath temperature of the nickel plating bath in roughened nickel plating is not particularly limited, and is preferably 25 to 60° C., more preferably 25 to 50° C., further preferably 30 to 50° C. from the viewpoint that the ten-point average roughness $Rz_{jis}$ of a surface of the roughened plated layer 12 can be more suitably controlled.

In the present embodiment, plating is preferably performed with stirring the content of the nickel plating bath in roughened nickel plating for precipitation of the nickel particulate materials 1210 aggregated. The content of the nickel plating bath is stirred and thus the nickel particulate materials 1210 are easily uniformly precipitated on the metal substrate 11 with being aggregated, and therefore the ten-point average roughness $Rz_{jis}$ of a surface of the roughened plated layer 12 can be more suitably controlled. The method for performing such stirring is not particularly limited, and examples thereof include a method such as bubbling, pump circulation, and the like. The type of a gas in bubbling conditions is not particularly limited, air is preferably used as the gas in terms of general-purpose properties, and the timing of gas supply is preferably continuous aeration for stable stirring.

The production method in the present embodiment involves precipitating the nickel particulate materials 1210 aggregated, by roughened nickel plating, to thereby form the roughened nickel plated layer 121 including the plurality of nickel particulate materials 1210, and then further performing zinc plating to thereby cover the nickel particulate materials 1210 with the zinc plated film 1220 and thus form the zinc plated layer 122 as the zinc plated film 1220 on the roughened nickel plated layer 121 configured from the plurality of nickel particulate materials 1210. Such zinc plating for covering the nickel particulate materials 1210 with the zinc plated film 1220 may be performed by any plating method of electrolytic plating or non-electrolytic plating, and is preferably electrolytic plating.

In a case where zinc plating is performed by an electrolytic plating method, the method is not particularly limited, and a method with electrolytic plating using a plating bath containing zinc sulfate heptahydrate at a concentration of 10 to 400 g/L and containing ammonium sulfate at a concentration of 10 to 100 g/L is preferable from the viewpoint that the ten-point average roughness $Rz_{jis}$ of a surface of the roughened plated layer 12 can be suitably controlled in the above range. The concentration of zinc sulfate heptahydrate in the plating bath used is preferably 50 to 300 g/L, more preferably 100 to 300 g/L, further preferably 200 to 300 g/L. The concentration of ammonium sulfate in the plating bath used is preferably 10 to 50 g/L, more preferably 10 to 45 g/L, further preferably 15 to 40 g/L. Herein, addition of ammonia to such a zinc plating bath may be addition of ammonia water, or addition in the form of a salt such as ammonium sulfate or ammonium chloride.

In a case where zinc plating is performed by an electrolytic plating method, the current density is preferably 1 to 60 A/dm$^2$, more preferably 5 to 30 A/dm$^2$, further preferably 10 to 20 A/dm$^2$, from the viewpoint that the ten-point average roughness $Rz_{jis}$ of a surface of the roughened plated layer 12 can be more suitably controlled. In a case where such zinc plating is performed by an electrolytic plating method, the bath temperature of the zinc plating bath is preferably 25 to 70° C., more preferably 30 to 60° C., further preferably 40 to 60° C., and the pH of the zinc plating bath is preferably 1 to 6, more preferably 1 to 3, further preferably 1 to 2.

Figure 4:
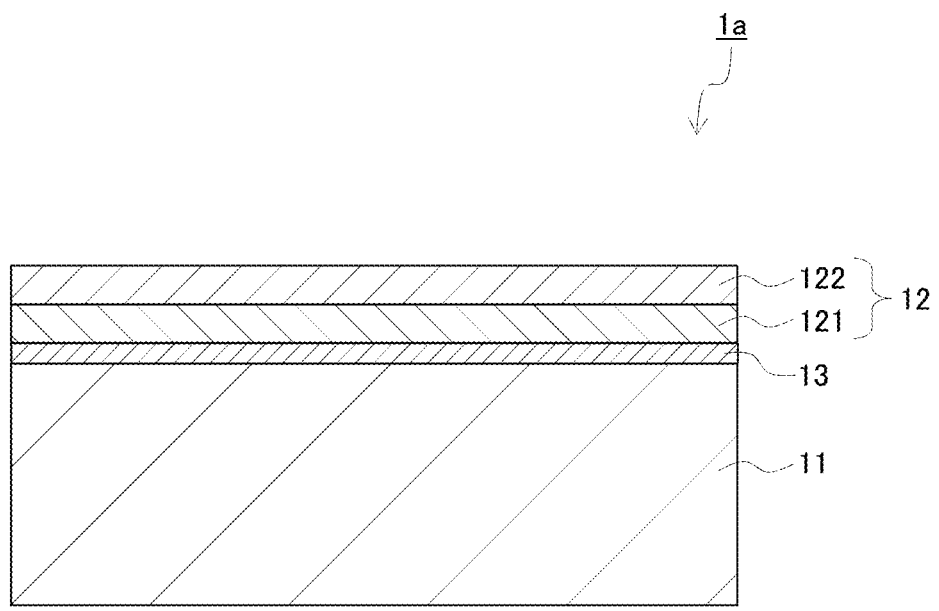
FIG. 4 is a configuration view of a roughened plated sheet according to another embodiment.

In the present embodiment, an underlying metal plated layer 13 is preferably formed between the metal substrate 11 and the roughened plated layer 12, more specifically, between the metal substrate 11 and the roughened nickel plated layer 121 forming the roughened plated layer 12, as illustrated in FIG. 4, from the viewpoint of a more enhancement in adhesiveness between the metal substrate 11 and the roughened plated layer 12. FIG. 4 is a view illustrating the configuration of a roughened plated sheet 1a according to another embodiment, and the roughened plated sheet 1a includes an underlying metal plated layer 13 on a metal substrate 11, and has a roughened plated layer 12 obtained by forming on the underlying metal plated layer 13, a roughened nickel plated layer 121 and a zinc plated layer 122 in the listed order. The underlying metal plated layer 13 is preferably a nickel plated layer or a zinc plated layer, more preferably a nickel plated layer. In particular, a plurality of nickel particulate materials 1210 forming the roughened nickel plated layer 121 are present as aggregates formed by aggregating and precipitating particles precipitated, in a protruded manner, a gap is preferably present between such aggregates from the viewpoint of adhesiveness to other members and thus a surface of the entire metal substrate 11 is not sometimes fully covered. Thus, for example, the underlying metal plated layer 13 is preferably provided in order to enhance the effect of suppressing the occurrence of rust on the steel sheet, for example, in the case of use of the steel sheet as the metal substrate 11. It is here preferable for the effect of enhancing corrosion resistance to select the metal substrate 11 depending on the intended use and perform the corresponding underlying plating processing, and it is preferable in the case of use of the steel sheet or copper in the metal substrate 11 to provide an underlying nickel plated layer or an underlying copper plated layer as the underlying metal plated layer 13. In a case where the metal substrate 11 is a copper sheet, plating adhesiveness of the roughened plated layer 12 can also be enhanced by performing an acid treatment or the like in a pre-treatment.

The underlying metal plated layer 13 can be formed by plating the metal substrate 11 in advance before roughened nickel plating for precipitation of the nickel particulate materials 1210 aggregated, on the metal substrate 11, namely, before formation of the roughened nickel plated layer 121 including the plurality of nickel particulate materials 1210. In a case where the underlying metal plated layer 13 is a nickel plated layer, the layer may be formed using any plating method of electrolytic plating or non-electrolytic plating, and is preferably formed by electrolytic plating.

In a case where an electrolytic plating method is used as the method for forming the underlying nickel plated layer in the case of the underlying metal plated layer 13 as a nickel plated layer, for example, a method can be used where the nickel plating bath used is a Watts bath of a bath composition of 200 to 350 g/L of nickel sulfate hexahydrate, 20 to 60 g/L of nickel chloride hexahydrate and 10 to 50 g/L of boric acid, nickel plating is performed in conditions of a pH of 3.0 to 5.0, a bath temperature of 40 to 70° C. and a current density of 5 to 30 A/dm$^2$ (preferably 10 to 20 A/M), and thereafter washing with water is performed. In a case where an electrolytic plating method is used as the method for forming the underlying zinc plated layer in the case of the underlying metal plated layer 13 as a zinc plated layer, examples include a method for electrolytic plating in the same conditions as those in the case of the zinc plated film 1220 (zinc plated layer 122).

As described above, according to one embodiment of the present invention, the roughened plated layer 12 having a detailed structure as illustrated in FIG. 2 can be formed by forming the roughened nickel plated layer 121 due to precipitation of the nickel particulate materials 1210 aggregated, on the metal substrate 11, by roughened nickel plating, as illustrated in FIG. 3, and then subjecting the resultant to zinc plating to thereby form the zinc plated layer 122 as the zinc plated film 1220, and these formation conditions can be controlled to thereby allow the ten-point average roughness $Rz_{jis}$ of a surface of the roughened plated layer 12 to be in the above range.

The above roughened plated sheet 1 of the present embodiment has excellent corrosion resistance (in particular, salt damage resistance and pitting corrosion resistance), and exhibits excellent adhesiveness to other members, and thus can be suitably used in applications where the roughened plated sheet is joined to other members and then used, for example, resins (for example, various resins such as nylon 6, nylon 66, nylon 610, nylon 12, polypropylene, an ABS resin, a polymethyl methacrylate resin, a thermoplastic polyurethane resin and an epoxy resin, and resin composites of such resins each containing a filler, a reinforced fiber and/or the like), various containers demanded to have adhesiveness to various members, building members, electronic equipment members (a housing, a shield member and a reinforcement member), and battery members (an outer case, a current collector and a tab lead).

EXAMPLES

Hereinafter, the present invention is more specifically described with reference to Examples, but the present invention is not limited to these Examples.

The methods for evaluating respective properties are as follows.

<Surface Roughness>

A visual field of 97 μm×129 μm (length×width) (measurement width of visual field: 129 μm, measurement area: about 12,500 μm$^2$ (12,500 μm$^2$±100 μm)) on a surface of the roughened plated sheet, on which the roughened plated layers (roughened nickel plated layer and zinc plated layer) were formed, was scanned with a laser microscope (model number: OLS3500 manufactured by Olympus Corporation) according to JIS B0601:2013, and then analyzed in a roughness analysis condition as an analysis mode with analysis software (software name: LEXT-OLS), and thus the arithmetic average roughness Ra and the ten-point average roughness $Rz_{jis}$ were measured. The cutoff value in measurement with the laser microscope was here a wavelength of about 43 μm (displayed: 43.2 μm) corresponding to a length one-third the measurement width of the visual field (129 μm).

<Adhesion Amount of Roughened Nickel Plated Layer and Adhesion Amount of Zinc Plate>

After the zinc plated layer was formed on the roughened nickel plated layer, the adhesion amount of a roughened nickel plate forming the roughened plated layer and the adhesion amount of a zinc plate forming the roughened plated layer were determined with a fluorescent X-ray apparatus.

In Examples 7, 8, 27, 28, 36, and 37 where the underlying nickel plated layer or the underlying zinc plated layer was formed, the adhesion amount of the underlying nickel plated layer or the underlying zinc plated layer was determined by performing measurement with a fluorescent X-ray apparatus after the step of forming the underlying nickel plated layer or the underlying zinc plated layer, and was subtracted to thereby determine the adhesion amount of a roughened nickel plate forming the roughened plated layer and the adhesion amount of a zinc plate forming the roughened plated layer.

<Lightness L*>

The lightness L* of a surface of the roughened plated layer was measured with a spectrophotometric colorimeter (product name "CM-5", manufactured by Konica Minolta, Inc.) in a SCE system (regular reflection light removal system), according to geometric conditions C in JIS Z8722.

<Glossiness at 85°>

The glossiness at 85° of a surface of the roughened plated layer was measured with a glossimeter (product name "VG 7000", manufactured by Nippon Denshoku Industries Co., Ltd.), according to JIS Z8741. The glossiness at 60° was measured with the same glossimeter, and the glossiness at 60° in each of Examples (Examples 1 to 32) was less than 1.5.

<Resin Adhesiveness (180° Peel Strength)>

A mold frame (made of SUS) of a predetermined size was prepared, and the roughened plated sheet and a resin sheet were stacked and placed in the frame so that the volume of the material relative to the volume in the frame was 105 to 110%. Next, the mold frame loaded with the material was sandwiched between SUS sheets each coated with a release agent, and then installed between the upper board and the lower board of hot pressing (G-12 model foot pump type small press (manufactured by Techno Supply Co., Ltd.).

A laminated sheet including a metal and a resin was produced by heating and pressurizing in the following lamination conditions.

<Lamination Conditions>

Figure 6:
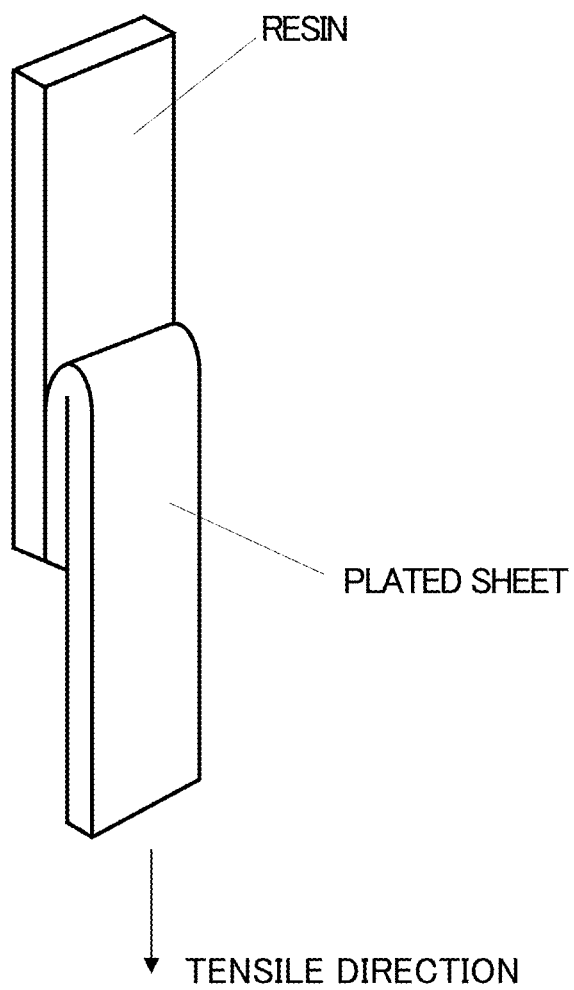
FIG. 6 is a view schematically illustrating a 180° peel test piece.

1) Preliminary heating→temperature: 180 to 310° C., surface pressure: 0.5 MPa, retention time: 3 minutes 2) Pressing→temperature: 180 to 310° C., surface pressure: 5 MPa, retention time: 7 minutes 3) Cooling/demolding→temperature: 70° C. or less, surface pressure: 5 MPa Next, the laminated sheet produced was cut to a dimension of a width of 20 mm and a length of 100 mm, and the metal was peeled to a position of 40 mm from an end in the length direction, to thereby obtain a 180° peel test piece. Next, the 180° peel test piece obtained was subjected to a tensile test with a tensile tester, and the peeling load (180° peel strength) was measured. The peeling strength was a value obtained by averaging the loads at a stroke of 25 mm to 75 mm and dividing the resultant by the width of the test piece. FIG. 6 schematically illustrates the 180° peel test piece.

It can be determined that, as the 180° peel strength is higher, adhesiveness to the resin is more excellent.

The 180° peel strength values in Examples 1 to 8 and Comparative Examples 1 and 12 were each represented by the index under the assumption that the value in Comparative Example 2 was 1.0, and the values in Examples 9 to 28 and Comparative Examples 3 and 13 were each represented by the index under the assumption that the value in Comparative Example 4 was 1.0. Similarly, the value in Example 29 was represented by the index under the assumption that the value in Comparative Example 5 was 1.0, the value in Example 30 was represented by the index under the assumption that the value in Comparative Example 6 was 1.0, the value in Example 31 was represented by the index under the assumption that the value in Comparative Example 7 was 1.0, the values in Examples 32, 36 and 37, and Comparative Example 14 were each represented by the index under the assumption that the value in Comparative Example 8 was 1.0, the value in Example 33 was represented by the index under the assumption that the value in Comparative Example 9 was 1.0, the value in Example 34 was represented by the index under the assumption that the value in Comparative Example 10 was 1.0, and the value in Example 35 was represented by the index under the assumption that the value in Comparative Example 11 was 1.0, respectively.

<Corrosion Resistance>

The roughened plated sheet was cut to 50 mm×130 mm, and a cut cross section was covered with a seal, to thereby obtain a strip-like evaluation sample. The strip-like evaluation sample was subjected to a salt water spray test with 5% by weight of NaCl in conditions of 35° C. and 98% for 72 hours, and the appearance of the evaluation sample after a lapse of 72 hours was visually observed to thereby evaluate corrosion resistance according to the following criteria. Such evaluation of corrosion resistance was performed in Examples 1, 7 and 8, Comparative Examples 1 and 2, Examples 23, 27 and 28, Comparative Examples 3 and 4, Examples 32, 36 and 37, Comparative Example 8, and Comparative Examples 12 to 14.

Excellent: no occurrence of visible red rust (spot rust)

Good: slight occurrence of visible red rust (spot rust) (at a level of less than ten spots)

Fair: occurrence of visible red rust (spot rust) (at a level of several ten spots) in whole Poor: occurrence of red rust or spot-like extremely large red rust on the entire surface Example 1

A steel sheet obtained by annealing a cold-rolled sheet (thickness 0.1 mm) of low carbon aluminum-killed steel was prepared as a base.

The steel sheet prepared was subjected to alkaline electrolytic degreasing, and acid pickling by immersion in sulfuric acid, and then electrolytic plating (roughened nickel plating) with a roughened nickel plating bath of the following bath composition in the following conditions, to thereby precipitate nickel particulate materials on one surface of the steel sheet, thereby forming a roughened nickel plated layer.

<Plating Conditions of Roughened Nickel>

Bath composition: 10 g/L of nickel sulfate hexahydrate, 10 g/L of nickel chloride hexahydrate, 20 g/L of ammonium sulfate pH: 6.0

Bath temperature: 35° C.

Current density: 15 A/dm$^2$

Plating time: 20.8 seconds

Next, the steel sheet where the nickel particulate materials were precipitated was subjected to electrolytic plating (zinc plating) with a zinc plating bath of the following bath composition in the following conditions, to thereby cover the nickel particulate materials precipitated on the steel sheet, with a zinc plated film, thereby obtaining a roughened plated sheet of Example 1.

<Plating Conditions of Zinc>

Bath composition: 220 g/L of zinc sulfate heptahydrate, 30 g/L of ammonium sulfate pH: 2.0

Bath temperature: 55° C.

Current density: 10 A/dm$^2$

Plating time: 47.0 seconds

The roughened plated sheet obtained was subjected to respective measurements of the adhesion amount of the roughened nickel plated layer, the adhesion amount of the zinc plated layer, the ten-point average roughness Rzjis of a surface of the roughened plated layer, the arithmetic average roughness Ra, and the lightness L* and the glossiness at 85° of a surface of the roughened plated layer. The results are shown in Table 1.

The roughened plated sheet obtained and a resin sheet of nylon 6 (PA6, thickness 1 mm) were used to produce a 180° peel test piece, and the 180° peel test piece obtained was used to evaluate resin adhesiveness (180° peel strength).

Specifically, first, the roughened plated sheet obtained and the resin sheet (nylon 6) were each cut to a dimension of 100 mm in length and 100 mm in width, such two materials were stacked so that the roughened plated layer on the roughened plated sheet was joined to the resin sheet, and were heated and pressurized by hot pressing, to thereby produce a laminated sheet.

15

<Lamination Conditions>
1) Preliminary heating→temperature: 270° C., surface pressure: 0.5 MPa, retention time: 3 minutes
2) Pressing→temperature: 270° C., surface pressure: 5 MPa, retention time: 7 minutes
3) Cooling/demolding→temperature: 70° C. or less, surface pressure: 5 MPa A 180° peel test piece was produced from the laminated sheet obtained, and resin adhesiveness (180° peel strength) was evaluated by the above method. The results are shown in Table 1.

Examples 2 to 6 and Comparative Example 1

Each roughened plated sheet and each 180° peel test piece of Examples 2 to 6 and Comparative Example 1 were obtained in the same manner as in Example 1 except that the plating time (processing time) of the roughened nickel plating and the plating time (processing time) of the zinc plating were changed to conditions shown in Table 1, and evaluation was performed in the same manner. The results are shown in Table 1.

Example 7

The steel sheet was subjected to alkaline electrolytic degreasing, and acid pickling by immersion in sulfuric acid, and then electrolytic plating with an underlying nickel plating bath of the following bath composition in the following conditions, to thereby form an underlying nickel plate having a thickness of 1 μm on each of both surfaces of the steel sheet, thereafter a roughened nickel plated layer was formed on such an underlying nickel plated layer and covering with a zinc plated film was applied thereon in the same manner as in Example 1, to thereby obtain a roughened plated sheet of Example 7, a 180° peel test piece was obtained in the same manner as in Example 1, and evaluation was performed in the same manner. The results are shown in Table 1.
<Plating Conditions of Underlying Nickel>
Bath composition: 250 g/L of nickel sulfate hexahydrate, 45 g/L of nickel chloride hexahydrate, 30 g/L of boric acid
pH: 4.2
Bath temperature: 60° C.
Current density: 10 A/dm$^2$ Example 8

The steel sheet was subjected to alkaline electrolytic degreasing, and acid pickling by immersion in sulfuric acid, and then electrolytic plating with an underlying zinc plating bath of the following bath composition, to thereby form an underlying zinc plate having a thickness of 1 μm on each of both surfaces of the steel sheet, thereafter a roughened nickel plated layer was formed on such an underlying zinc plated layer and covering with a zinc plated film was applied thereon in the same manner as in Example 1, to thereby obtain a roughened plated sheet of Example 8, a 180° peel test piece was obtained in the same manner as in Example 1, and evaluation was performed in the same manner. The results are shown in Table 1.
<Plating Conditions of Underlying Zinc>
Bath composition: 220 g/L of zinc sulfate heptahydrate, 30 g/L of ammonium sulfate
pH: 2.0
Bath temperature: 55° C.
Current density: 10 A/dm$^2$

16

Comparative Example 2

A plated sheet and a 180° peel test piece were obtained in the same manner as in Example 1 except that no roughened nickel plating was formed and zinc plating was directly applied on the steel sheet, and evaluation was performed in the same manner. The results are shown in Table 1.

Example 9

A roughened plated sheet of Example 9 was obtained in the same manner as in Example 1 except that the plating time (processing time) of the roughened nickel plating and the plating time (processing time) of the zinc plating were changed to conditions shown in Table 2, and evaluation was performed in the same manner. A 180° peel test piece was obtained in the same manner as in Example 1 except that the roughened plated sheet obtained was used, an epoxy resin (EP, thickness 1 nm), instead of nylon 6, was used in the resin sheet and the heating temperature in hot pressing was changed to 180° C., and resin adhesiveness (180° peel strength) was evaluated by the above method. The results are shown in Table 2.

Examples 10 to 26 and Comparative Example 3

Each roughened plated sheet and each 180° peel test piece of Examples 10 to 26 and Comparative Example 3 were obtained in the same manner as in Example 9 except that the plating time (processing time) of the roughened nickel plating, the plating time (processing time) of the zinc plating, the plating bath, the current density, the pH and the bath temperature were changed to conditions shown in Table 2, and evaluation was performed in the same manner. The results are shown in Table 2.

Example 27

An underlying nickel plate having a thickness of 1 μm was formed on each of both surfaces of the steel sheet in the same manner as in Example 7, thereafter a roughened nickel plated layer was formed on such an underlying nickel plated layer and covering with a zinc plated film was applied thereon in the same manner as in Example 23, to thereby obtain a roughened plated sheet of Example 27, a 180° peel test piece was obtained in the same manner as in Example 9, and evaluation was performed in the same manner. The results are shown in Table 2.

Example 28

An underlying zinc plate having a thickness of 1 μm was formed on each of both surfaces of the steel sheet in the same manner as in Example 8, thereafter a roughened nickel plated layer was formed on such an underlying zinc plated layer and covering with a zinc plated film was applied thereon in the same manner as in Example 23, to thereby obtain a roughened plated sheet of Example 28, a 180° peel test piece was obtained in the same manner as in Example 9, and evaluation was performed in the same manner. The results are shown in Table 2.

Comparative Example 4

A plated sheet and a 180° peel test piece were obtained in the same manner as in Example 18 except that no roughened nickel plating was formed, and evaluation was performed in the same manner. The results are shown in Table 1.

Example 29

A 180° peel test piece was obtained in the same manner as in Example 1 except that, when the 180° peel test piece was obtained, nylon 66 (PA66, thickness 1 nm), instead of nylon 6, was used in the resin sheet and the heating temperature in hot pressing was changed to 280° C., and resin adhesiveness (180° peel strength) was evaluated by the above method. The results are shown in Table 3.

Example 30

A 180° peel test piece was obtained in the same manner as in Example 1 except that, when the 180° peel test piece was obtained, nylon 610 (PA610, thickness 1 nm), instead of nylon 6, was used in the resin sheet, and resin adhesiveness (180° peel strength) was evaluated by the above method. The results are shown in Table 3.

Example 31

A 180° peel test piece was obtained in the same manner as in Example 1 except that, when the 180° peel test piece was obtained, nylon 12 (PA12, thickness 1 mm), instead of nylon 6, was used in the resin sheet and the heating temperature in hot pressing was changed to 240° C., and resin adhesiveness (180° peel strength) was evaluated by the above method. The results are shown in Table 3.

Example 32

A 180° peel test piece was obtained in the same manner as in Example 1 except that, when the 180° peel test piece was obtained, a polypropylene resin (PP, thickness 1 mm), instead of nylon 6, was used in the resin sheet and the heating temperature in hot pressing was changed to 200° C., and resin adhesiveness (180° peel strength) was evaluated by the above method. The results are shown in Table 3.

Example 33

A 180° peel test piece was obtained in the same manner as in Example 1 except that, when the 180° peel test piece was obtained, an ABS resin (ABS, thickness 1 mm), instead of nylon 6, was used in the resin sheet and the heating temperature in hot pressing was changed to 240° C., and resin adhesiveness (180° peel strength) was evaluated by the above method. The results are shown in Table 3.

Example 34

A 180° peel test piece was obtained in the same manner as in Example 1 except that, when the 180° peel test piece was obtained, a polymethyl methacrylate resin (PMMA, thickness 1 mm), instead of nylon 6, was used in the resin sheet and the heating temperature in hot pressing was changed to 250° C., and resin adhesiveness (180° peel strength) was evaluated by the above method. The results are shown in Table 3.

Example 35

A 180° peel test piece was obtained in the same manner as in Example 1 with the roughened plated sheet obtained in the same manner as in Example 1 except that, when the 180° peel test piece was obtained, a thermoplastic polyurethane resin (TPU, thickness 1 nm), instead of nylon 6, was used in the resin sheet and the heating temperature in hot pressing was changed to 220° C., and resin adhesiveness (180° peel strength) was evaluated by the above method. The results are shown in Table 3.

Example 36

A 180° peel test piece was obtained in the same manner as in Example 7 except that, when the 180° peel test piece was obtained, a polypropylene resin (PP, thickness 1 nm), instead of nylon 6, was used in the resin sheet and the heating temperature in hot pressing was changed to 200° C., and resin adhesiveness (180° peel strength) was evaluated by the above method. The results are shown in Table 3.

Example 37

A 180° peel test piece was obtained in the same manner as in Example 8 except that, when the 180° peel test piece was obtained, a polypropylene resin (PP, thickness 1 mm), instead of nylon 6, was used in the resin sheet and the heating temperature in hot pressing was changed to 200° C., and resin adhesiveness (180° peel strength) was evaluated by the above method. The results are shown in Table 3.

Comparative Examples 5 to 11

Respective 180° peel test pieces were obtained in the same manner as in Comparative Example 2 with the plated sheet obtained in the same manner as in Comparative Example 2 except that, when the 180° peel test pieces were obtained, the nylon 66 sheet (Comparative Example 5), the nylon 610 sheet (Comparative Example 6), the nylon 12 sheet (Comparative Example 7), the polypropylene resin sheet (Comparative Example 8), the ABS resin sheet (Comparative Example 9), the polymethyl the methacrylate resin sheet (Comparative Example 10) and the thermoplastic polyurethane resin sheet (Comparative Example 11) respectively used in Examples 29 to 35 were used in the resin sheets and the heating temperatures in hot pressing were temperatures depending on such respective resin sheets, and resin adhesiveness (180° peel strength) was evaluated by the above method. The results are shown in Table 3.

Comparative Example 12

The steel sheet was subjected to alkaline electrolytic degreasing, and acid pickling by immersion in sulfuric acid, and then electrolytic plating with a nickel plating bath of the following bath composition in the following conditions, to thereby form a nickel plate having a thickness of 1 μm on each of both surfaces of the steel sheet, thereby obtaining a nickel plated sheet. The nickel plated sheet obtained was evaluated in the same manner as in Example 1, a 180° peel test piece was obtained in the same manner as in Example 1 with the nickel plated sheet obtained, and evaluation was performed in the same manner. The results are shown in Table 4.

<Plating Conditions of Nickel>
Bath composition: 250 g/L of nickel sulfate hexahydrate, 45 g/L of nickel chloride hexahydrate, 30 g/L of boric acid
pH: 4.2
Bath temperature: 60° C.
Current density: 10 A/dm$^2$
Plating time: 31.2 seconds

Comparative Example 13

A 180° peel test piece was obtained in the same manner as in Comparative Example 12 except that, when the 180° peel test piece was obtained, an epoxy resin (EP, thickness 1 mm), instead of nylon 6, was used in the resin sheet and the heating temperature in hot pressing was changed to 180° C., and resin adhesiveness (180° peel strength) was evaluated by the above method. The results are shown in Table 4.

Comparative Example 14

A 180° peel test piece was obtained in the same manner as in Comparative Example 12 except that, when the 180° peel test piece was obtained, a polypropylene resin (PP, thickness 1 mm), instead of nylon 6, was used in the resin sheet and the heating temperature in hot pressing was changed to 200° C., and resin adhesiveness (180° peel strength) was evaluated by the above method. The results are shown in Table 4.

TABLE 1

| | | Plating conditions of roughened nickel | | | | | | | Plating conditions of zinc | | |
| --- | --- | --- | --- | --- | --- | --- | --- | --- | --- | --- | --- |
| | | Plating bath | | | | | | | Plating bath | | |
| | Type of resin adhered | Underlying metal plated layer | Ni sulfate hexahydrate [g/L] | Ni chloride hexahydrate [g/L] | Ammonium sulfate [g/L] | Bath temperature [° C.] | pH | Current density [A/dm²] | Processing time [sec] | Zn sulfate heptahydrate [g/L] | Ammonium sulfate [g/L] | Bath temperature [° C.] |
| Example 1 | PA6 | None | 10 | 10 | 20 | 35 | 6.0 | 15 | 20.8 | 220 | 30 | 55 |
| Example 2 | PA6 | None | 10 | 10 | 20 | 35 | 6.0 | 15 | 31.2 | 220 | 30 | 55 |
| Example 3 | PA8 | None | 10 | 10 | 20 | 35 | 6.0 | 15 | 41.6 | 220 | 30 | 55 |
| Example 4 | PA8 | None | 10 | 10 | 20 | 35 | 6.0 | 15 | 31.2 | 220 | 30 | 55 |
| Example 5 | PA8 | None | 10 | 10 | 20 | 35 | 6.0 | 15 | 20.8 | 220 | 30 | 55 |
| Example 6 | PA6 | None | 10 | 10 | 20 | 35 | 6.0 | 15 | 20.8 | 220 | 30 | 55 |
| Example 7 | PA6 | Ni Layer (1 μm) | 10 | 10 | 20 | 35 | 6.0 | 15 | 20.8 | 220 | 30 | 55 |
| Example 8 | PA6 | Zn Layer (1 μm) | 10 | 10 | 20 | 35 | 6.0 | 15 | 20.8 | 220 | 30 | 55 |
| Comparative Example 1 | PA8 | None | 10 | 10 | 20 | 35 | 6.0 | 15 | 10.4 | 220 | 30 | 55 |
| Comparative Example 2 | PA8 | None | — | — | — | — | — | — | — | 220 | 30 | 55 |

| | Plating conditions of zinc | | | Adhesion amount of roughend plate | | | Surface roughness | | Glossiness 85° | Lightness L* SCE | Adhesiveness of [relative ratio] | Corrosion resistance |
| --- | --- | --- | --- | --- | --- | --- | --- | --- | --- | --- | --- | --- |
| | pH | Current density [A/dm²] | Processing time [sec] | Ni layer [g/m²] | Zn layer [g/m²] | Zn/(Ni + Zn) | Ra [μm] | Rzjis [μm] | | | | |
| Example 1 | 2.0 | 18 | 47.0 | 4.1 | 14.2 | 0.8 | 0.5 | 5.8 | 13.0 | 66.0 | 311.0 | Good |
| Example 2 | 2.0 | 16 | 47.0 | 6.2 | 11.6 | 0.7 | 1.4 | 10.5 | 2.2 | 57.9 | 260.0 | — |
| Example 3 | 2.0 | 16 | 47.0 | 8.2 | 11.0 | 0.6 | 2.3 | 21.1 | 0.6 | 51.04 | 272.0 | — |
| Example 4 | 2.0 | 16 | 70.5 | 7.1 | 18.8 | 0.7 | 0.8 | 8.5 | 5.6 | 64.31 | 284.0 | — |
| Example 5 | 2.0 | 16 | 23.5 | 4.8 | 6.8 | 0.6 | 0.7 | 7.5 | 13.2 | 56.36 | 296.0 | — |
| Example 6 | 2.0 | 16 | 70.5 | 4.1 | 21.2 | 0.8 | 0.5 | 5.0 | 16.7 | 74.26 | 112.0 | — |
| Example 7 | 2.0 | 16 | 47.0 | 4.3 | 14.8 | 0.8 | 0.6 | 6.4 | 11.8 | 64.80 | 362.0 | Excellent |
| Example 8 | 2.0 | 16 | 47.0 | 4.3 | 15.3 | 0.8 | 0.5 | 5.4 | 14.9 | 67.00 | 184.0 | Excellent |
| Comparative Example 1 | 2.0 | 16 | 47.0 | 1.8 | 15.9 | 0.9 | 0.1 | 2.8 | 83.7 | 83.9 | 1.0 | Good |
| Comparative Example 2 | 2.0 | 16 | 47.0 | 0 | 16.3 | 1.0 | 0.2 | 2.3 | 83.6 | 85.6 | 1.0 | Good |

TABLE 2

| | Type of resin adhered | Underlying metal plated layer | Plating conditions of roughened nickel | | | | | | | Plating conditions of zinc | | |
|---|---|---|---|---|---|---|---|---|---|---|---|---|
| | | | Plating bath | | | | | | | Plating bath | | |
| | | | Ni sulfate hexahydrate [g/L] | Ni chloride hexahydrate [g/L] | Ammonium sulfate [g/L] | Bath temperature [° C.] | pH | Current density [A/dm²] | Processing time [sec] | Zn sulfate heptahydrate [g/L] | Ammonium sulfate [g/L] | Bath temperature [° C.] |
| Example 9 | Epoxy | None | 10 | 10 | 20 | 35 | 6.0 | 15 | 25.0 | 220 | 30 | 55 |
| Example 10 | Epoxy | None | 10 | 10 | 20 | 35 | 6.0 | 15 | 25.0 | 220 | 30 | 55 |
| Example 11 | Epoxy | None | 10 | 10 | 20 | 35 | 6.0 | 15 | 25.0 | 220 | 30 | 55 |
| Example 12 | Epoxy | None | 10 | 10 | 20 | 35 | 6.0 | 15 | 25.0 | 220 | 30 | 55 |
| Example 13 | Epoxy | None | 10 | 10 | 20 | 35 | 6.0 | 15 | 25.0 | 220 | 30 | 55 |
| Example 14 | Epoxy | None | 10 | 10 | 20 | 35 | 6.0 | 15 | 25.0 | 220 | 30 | 55 |
| Example 15 | Epoxy | None | 10 | 10 | 20 | 35 | 6.0 | 15 | 25.0 | 220 | 30 | 55 |
| Example 16 | Epoxy | None | 10 | 10 | 20 | 35 | 6.0 | 15 | 25.0 | 220 | 30 | 55 |
| Example 17 | Epoxy | None | 10 | 10 | 20 | 35 | 6.0 | 15 | 25.0 | 220 | 30 | 55 |
| Example 18 | Epoxy | None | 10 | 10 | 20 | 35 | 6.0 | 15 | 18.6 | 220 | 30 | 55 |
| Example 19 | Epoxy | None | 10 | 10 | 20 | 35 | 6.0 | 15 | 18.6 | 220 | 30 | 55 |
| Example 20 | Epoxy | None | 10 | 10 | 20 | 35 | 6.0 | 15 | 18.6 | 220 | 30 | 55 |
| Example 21 | Epoxy | None | 10 | 10 | 20 | 35 | 6.0 | 15 | 18.6 | 220 | 30 | 55 |
| Example 22 | Epoxy | None | 10 | 10 | 20 | 35 | 6.0 | 15 | 18.6 | 220 | 0 | 30 |
| Example 23 | Epoxy | None | 10 | 10 | 20 | 35 | 6.0 | 15 | 23.1 | 220 | 30 | 55 |
| Example 24 | Epoxy | None | 10 | 10 | 20 | 35 | 6.0 | 15 | 34.7 | 220 | 30 | 55 |
| Example 25 | Epoxy | None | 10 | 10 | 20 | 35 | 6.0 | 15 | 46.2 | 220 | 30 | 55 |
| Example 26 | Epoxy | None | 10 | 10 | 20 | 35 | 6.0 | 15 | 57.8 | 220 | 30 | 55 |
| Example 27 | Epoxy | Ni Layer (1 μm) | 10 | 10 | 20 | 35 | 6.0 | 15 | 23.1 | 220 | 30 | 55 |
| Example 28 | Epoxy | Zn Layer (1 μm) | 10 | 10 | 20 | 35 | 6.0 | 15 | 23.1 | 220 | 30 | 55 |
| Comparative Example 3 | Epoxy | None | 10 | 10 | 20 | 35 | 6.0 | 15 | 11.6 | 220 | 30 | 55 |
| Comparative Example 4 | Epoxy | None | — | — | — | — | — | — | — | 220 | 30 | 55 |

| | Plating conditions of zinc | | | Adhesion amount of roughend plate | | | Surface roughness | | Glossiness 85° | Lightness L* SCE | Adhesiveness of [relative ratio] | Corrosion resistance |
|---|---|---|---|---|---|---|---|---|---|---|---|---|
| | pH | Current density [A/dm²] | Processing time [sec] | Ni layer [g/m²] | Zn layer [g/m²] | Zn/(Ni + Zn) | Ra [μm] | Rzjis [μm] | | | | |
| Example 9 | 2.0 | 10 | 24.0 | 3.7 | 5.7 | 0.6 | 0.9 | 9.5 | 4.0 | 53.2 | 8.3 | — |
| Example 10 | 2.0 | 10 | 48.0 | 3.6 | 12.5 | 0.8 | 0.9 | 8.4 | 4.1 | 61.6 | 10.9 | — |
| Example 11 | 2.0 | 10 | 72.0 | 3.4 | 20.1 | 0.9 | 0.8 | 8.6 | 3.8 | 63.9 | 8.0 | — |
| Example 12 | 2.0 | 20 | 12.0 | 3.4 | 5.5 | 0.6 | 0.8 | 9.0 | 4.9 | 52.7 | 8.7 | — |
| Example 13 | 2.0 | 20 | 24.0 | 3.7 | 12.1 | 0.8 | 0.8 | 7.8 | 5.7 | 60.7 | 10.7 | — |
| Example 14 | 2.0 | 20 | 36.0 | 3.5 | 19.8 | 0.9 | 0.9 | 11.3 | 4.5 | 66.7 | 10.0 | — |
| Example 15 | 2.0 | 30 | 8.0 | 3.9 | 5.3 | 0.6 | 0.9 | 9.0 | 4.8 | 50.5 | 7.6 | — |
| Example 16 | 2.0 | 30 | 16.0 | 4.2 | 11.7 | 0.7 | 0.9 | 8.7 | 5.6 | 58.2 | 9.5 | — |
| Example 17 | 2.0 | 30 | 24.0 | 3.4 | 18.8 | 0.8 | 1.2 | 11.1 | 1.9 | 64.1 | 10.1 | — |
| Example 18 | 2.0 | 10 | 38.4 | 2.7 | 10.7 | 0.8 | 0.5 | 5.7 | 17.9 | 65.8 | 7.6 | — |
| Example 19 | 2.0 | 5 | 76.8 | 3.3 | 10.6 | 0.8 | 0.4 | 4.6 | 25.3 | 67.9 | 6.8 | — |
| Example 20 | 2.0 | 2 | 192.0 | 3.3 | 10.5 | 0.8 | 0.4 | 5.0 | 21.3 | 68.0 | 8.8 | — |
| Example 21 | 4.0 | 10 | 38.4 | 3.6 | 10.4 | 0.7 | 0.4 | 4.5 | 33.4 | 68.7 | 7.0 | — |
| Example 22 | 5.3 | 7.5 | 76.8 | 3.2 | 15.1 | 0.8 | 0.3 | 4.4 | 35.5 | 76.6 | 4.6 | — |
| Example 23 | 2.0 | 10 | 192.0 | 4.2 | 14.4 | 0.8 | 0.8 | 7.4 | 6.6 | 63.9 | 11.3 | Good |
| Example 24 | 2.0 | 10 | 38.4 | 6.6 | 11.3 | 0.6 | 1.2 | 10.4 | 2.1 | 59.0 | 12.3 | — |
| Example 25 | 2.0 | 10 | 67.2 | 9.1 | 9.8 | 0.5 | 2.1 | 17.9 | 0.5 | 53.6 | 9.5 | — |
| Example 26 | 2.0 | 10 | 44.2 | 9.7 | 9.2 | 0.5 | 3.3 | 28.1 | 0.3 | 49.2 | 8.7 | — |
| Example 27 | 2.0 | 10 | 44.2 | 4.3 | 14.7 | 0.8 | 0.8 | 8.1 | 6.3 | 62.7 | 13.2 | Excellent |
| Example 28 | 2.0 | 10 | 44.2 | 4.3 | 13.7 | 0.8 | 0.8 | 7.4 | 7.8 | 64.7 | 7.3 | Excellent |
| Comparative Example 3 | 2.0 | 10 | 44.2 | 2.0 | 14.5 | 0.9 | 0.1 | 2.3 | 94.4 | 86.7 | 1.0 | Good |
| Comparative Example 4 | 2.0 | 10 | 38.4 | 0.0 | 12.1 | 1.0 | 0.1 | 2.2 | 97.3 | 85.7 | 1.0 | Fair |

TABLE 3

| | | | Plating conditions of roughened nickel | | | | | | | Plating conditions of zinc | | |
|---|---|---|---|---|---|---|---|---|---|---|---|---|
| | | | Plating bath | | | | | | | Plating bath | | |
| | Type of resin adhered | Underlying metal plated layer | Ni sulfate hexahydrate [g/L] | Ni chloride hexahydrate [g/L] | Ammonium sulfate [g/L] | Bath temperature [° C.] | pH | Current density [A/dm²] | Processing time [sec] | Zn sulfate heptahydrate [g/L] | Ammonium sulfate [g/L] | Bath temperature [° C.] |
| Example 29 | PA66 | None | 10 | 10 | 20 | 35 | 6.0 | 15 | 20.8 | 220 | 30 | 55 |
| Example 30 | PA610 | None | 10 | 10 | 20 | 35 | 6.0 | 15 | 20.8 | 220 | 30 | 55 |
| Example 31 | PA12 | None | 10 | 10 | 20 | 35 | 6.0 | 15 | 20.8 | 220 | 30 | 55 |
| Example 32 | PP | None | 10 | 10 | 20 | 35 | 6.0 | 15 | 20.8 | 220 | 30 | 55 |
| Example 33 | ABS | None | 10 | 10 | 20 | 35 | 6.0 | 15 | 20.8 | 220 | 30 | 55 |
| Example 34 | PMMA | None | 10 | 10 | 20 | 35 | 6.0 | 15 | 20.8 | 220 | 30 | 55 |
| Example 35 | TPU | None | 10 | 10 | 20 | 35 | 6.0 | 15 | 20.8 | 220 | 30 | 55 |
| Example 36 | PP | Ni Layer (1 μm) | 10 | 10 | 20 | 35 | 6.0 | 15 | 20.8 | 220 | 30 | 55 |
| Example 37 | PP | Zn Layer (1 μm) | 10 | 10 | 20 | 35 | 6.0 | 15 | 20.8 | 220 | 30 | 55 |
| Comparative Example 5 | PA66 | None | — | — | — | — | — | — | — | 220 | 30 | 55 |
| Comparative Example 6 | PA610 | None | — | — | — | — | — | — | — | 220 | 30 | 55 |
| Comparative Example 7 | PA12 | None | — | — | — | — | — | — | — | 220 | 30 | 55 |
| Comparative Example 8 | PP | None | — | — | — | — | — | — | — | 220 | 30 | 55 |
| Comparative Example 9 | ABS | None | — | — | — | — | — | — | — | 220 | 30 | 55 |
| Comparative Example 10 | PMMA | None | — | — | — | — | — | — | — | 220 | 30 | 55 |
| Comparative Example 11 | TPU | None | — | — | — | — | — | — | — | 220 | 30 | 55 |

| | Plating conditions of zinc | | | Adhesion amount of roughend plate | | | Surface roughness | | Glossiness | Lightness | Adhesiveness of [relative ratio] | Corrosion resistance |
|---|---|---|---|---|---|---|---|---|---|---|---|---|
| | pH | Current density [A/dm²] | Processing time [sec] | Ni layer [g/m²] | Zn layer [g/m²] | Zn/(Ni + Zn) | Ra [μm] | Rzjis [μm] | 85° | L* SCE | | |
| Example 29 | 2.0 | 10 | 47.0 | 4.1 | 14.2 | 0.8 | 0.7 | 7.4 | 11.2 | 64.5 | 2.9 | — |
| Example 30 | 2.0 | 10 | 47.0 | 4.1 | 14.2 | 0.8 | 0.6 | 5.7 | 12.7 | 66.6 | 224.0 | — |
| Example 31 | 2.0 | 10 | 47.0 | 4.1 | 14.2 | 0.8 | 0.6 | 7.0 | 12.9 | 66.0 | 324.0 | — |
| Example 32 | 2.0 | 10 | 47.0 | 4.1 | 14.2 | 0.8 | 0.5 | 5.3 | 13.5 | 66.4 | 2.9 | Good |
| Example 33 | 2.0 | 10 | 47.0 | 4.1 | 14.2 | 0.8 | 0.6 | 6.7 | 10.8 | 64.6 | 3.4 | — |
| Example 34 | 2.0 | 10 | 47.0 | 4.1 | 14.2 | 0.8 | 0.5 | 5.9 | 17.5 | 68.6 | 3.7 | — |
| Example 35 | 2.0 | 10 | 47.0 | 4.1 | 14.2 | 0.8 | 0.5 | 6.3 | 14.8 | 67.5 | 5.3 | — |
| Example 36 | 2.0 | 10 | 47.0 | 4.0 | 13.9 | 0.8 | 0.6 | 6.1 | 12.7 | 64.8 | 3.9 | Excellent |
| Example 37 | 2.0 | 10 | 47.0 | 4.1 | 14.4 | 0.8 | 0.5 | 5.5 | 14.8 | 66.9 | 2.0 | Excellent |
| Comparative Example 5 | 2.0 | 10 | 47.0 | 0 | 16.3 | 1.0 | 0.2 | 2.7 | 82.2 | 84.5 | 1.0 | — |
| Comparative Example 6 | 2.0 | 10 | 47.0 | 0 | 16.3 | 1.0 | 0.2 | 4.5 | 74.9 | 84.5 | 1.0 | — |
| Comparative Example 7 | 2.0 | 10 | 47.0 | 0 | 16.3 | 1.0 | 0.2 | 3.4 | 83.9 | 83.9 | 1.0 | — |
| Comparative Example 8 | 2.0 | 10 | 47.0 | 0 | 16.3 | 1.0 | 0.1 | 2.6 | 92.1 | 83.3 | 1.0 | Good |
| Comparative Example 9 | 2.0 | 10 | 47.0 | 0 | 16.3 | 1.0 | 0.1 | 2.7 | 75.1 | 83.8 | 1.0 | — |
| Comparative Example 10 | 2.0 | 10 | 47.0 | 0 | 16.3 | 1.0 | 0.2 | 3.3 | 79.0 | 85.0 | 1.0 | — |
| Comparative Example 11 | 2.0 | 10 | 47.0 | 0 | 16.3 | 1.0 | 0.1 | 2.8 | 86.4 | 84.8 | 1.0 | — |

TABLE 4

| | Type of resin adhered | Under-lying metal plated layer | Plating conditions of nickel | | | | | | | Plating conditions of zinc | | |
|---|---|---|---|---|---|---|---|---|---|---|---|---|
| | | | Plating bath | | | | | | | Plating bath | | |
| | | | Ni sulfate hexa-hydrate [g/L] | Ni chloride hexa-hydrate [g/L] | Boric acid [g/L] | Bath temper-ature [° C.] | pH | Current density [A/dm$^2$] | Proc-essing time [sec] | Zn sulfate hepta-hydrate [g/L] | Ammo-nium sulfate [g/L] | Bath temper-ature [° C.] |
| Comparative Example 12 | PA6 | None | 250 | 45 | 30 | 60 | 4.2 | 10 | 31.2 | — | — | — |
| Comparative Example 13 | Epoxy | None | 250 | 45 | 30 | 60 | 4.2 | 10 | 31.2 | — | — | — |
| Comparative Example 14 | PP | None | 250 | 45 | 30 | 60 | 4.2 | 10 | 31.2 | — | — | — |

| | Plating conditions of zinc | | | Adhesion amount of plate | | | Surface roughness | | Gloss-iness 85° | Lightness L* SCE | Adhesive-ness of [relative ratio] | Corrosion resistance |
|---|---|---|---|---|---|---|---|---|---|---|---|---|
| | pH | Current density [A/dm$^2$] | Processing time [sec] | Ni layer [g/m$^2$] | Zn layer [g/m$^2$] | Zn/(Ni + Zn) | Ra [μm] | Rzjis [μm] | | | | |
| Comparative Example 12 | — | — | — | 8.9 | — | — | 0.1 | 1.8 | 76.3 | — | 1.0 | Poor |
| Comparative Example 13 | — | — | — | 8.9 | — | — | 0.1 | 1.8 | 76.3 | — | 1.0 | Poor |
| Comparative Example 14 | — | — | — | 8.9 | — | — | 0.1 | 1.8 | 76.3 | — | 1.0 | Poor |

As confirmed from Tables 1 to 4, all the roughened plated sheets each including the roughened plated layer obtained by forming the roughened nickel plated layer and the zinc plated layer in the listed order, in which the ten-point average roughness Rz$_{jis}$ of a surface of the roughened plated layer was 3 μm or more, were excellent in adhesiveness to various resins (Examples 1 to 37).

On the other hand, in cases where the ten-point average roughness Rz$_{jis}$ of a surface of the roughened plated layer was less than 3 μm and where no roughened plated layer was formed (namely, no roughened nickel plated layer was formed and the zinc plated layer was directly formed), adhesiveness to various resins was inferior (Comparative Examples 1 to 11).

Also in a case where no roughened plated layer was formed, adhesiveness to various resins was inferior (Comparative Examples 12 to 14).

In a case where the underlying nickel plated layer was formed under the roughened plated layer, resin adhesiveness was more excellent and corrosion resistance was extremely excellent (Examples 7, 27 and 36).

In a case where the underlying zinc plated layer was formed under the roughened plated layer, corrosion resistance was extremely excellent (Examples 8, 28 and 37).

No extreme differences in surface roughness and appearance were observed regardless of the presence of the underlying plated layer, and furthermore it could be considered from the results in Example 1, Example 23 and Example 32 that excellent corrosion resistance could be realized also in other Examples.

Figure 5A:
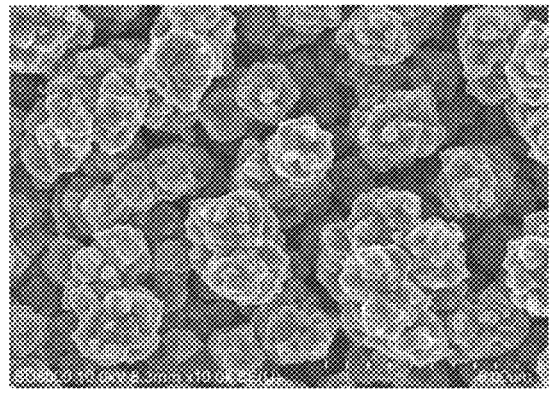
FIG. 5(A) is an image obtained by observation of a surface of a roughened plated sheet of Example 1 with an scanning electron microscope (SEM)
Figure 5B:
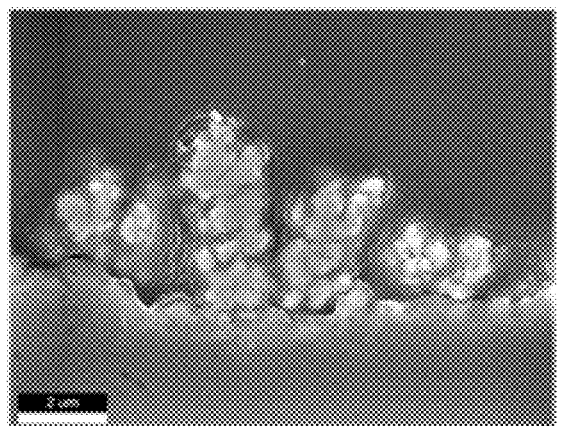
FIG. 5(B) is an image obtained by observation of a cross section of the roughened plated sheet of Example 1 with a scanning electron microscope (SFM)
Figure 5C:
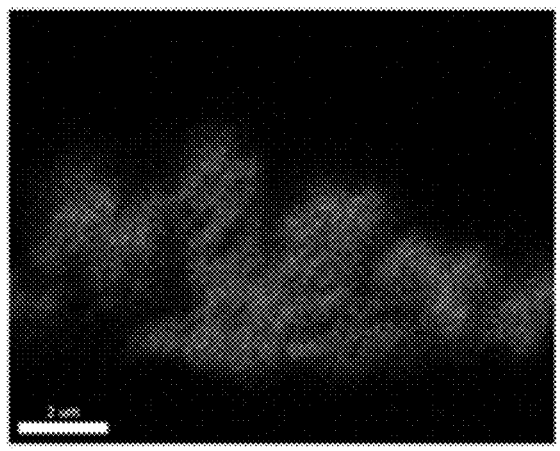
FIG. 5(C) is an image illustrating a zinc atom distribution by an energy-dispersive x-ray spectrometer (EDS) in observation of the cross section illustrated in FIG. 5(B) with a scanning electron microscope (SEM).

FIG. 5(A) is an image obtained by observation of a surface of the roughened plated sheet of Example 1 with an scanning electron microscope (SEM), FIG. 5(B) is an image obtained by observation of a cross section of the roughened plated sheet of Example 1 with a scanning electron microscope (SEM), and FIG. 5(C) is an image illustrating a zinc atom distribution by an energy-dispersive x-ray spectrometer (EDS) in observation of the cross section illustrated in FIG. 5(B) with a scanning electron microscope (SEM)). As clear from comparison between FIG. 5(B) and FIG. 5(C), the roughened plated layer of Example 1, in which the zinc plated film (zinc plated layer) was formed on surfaces of the plurality of nickel particulate materials forming the roughened nickel plated layer, thus could be said to be able to sufficiently exhibit excellent corrosion resistance of the zinc plated film (zinc plated layer). This applied to all Examples 1 to 31 including Example 1.

The location of the interface between the substrate and the roughened plated layer was determined based on the location of the root of each protrusion, with respect to the roughened plated layer protruded, obtained by forming the zinc plated film (zinc plated layer) on surfaces of the nickel particulate materials as in FIG. 5(B) and FIG. 5(C), and it was thus confirmed that the roughened plated layer was favorably formed with the interface as a boundary.

The adhesiveness (adhesiveness of the roughened plated layer by itself to the metal substrate) of the roughened plated layer evaluated by the following evaluation method was evaluated in Examples 1, 4, 6 to 8, 10, 11, 13, 14, 18 to 24 and 27 to 37 each exhibiting an arithmetic average roughness Ra of a surface of the roughened plated layer 12, of 1.1 μm or less, and a lightness of a surface of the roughened plated layer 12, as the L* value, of 58.5 or more, and thus a favorable result of a ΔE*ab of less than 5 was obtained and adhesiveness of the roughened plated layer was also excellent in each of the Examples.

Hereinafter, the method for evaluating the adhesiveness of the roughened plated layer is indicated.

<Adhesiveness of Roughened Plated Layer>

First, a pressure-sensitive adhesive tape (trade name "Cellotape (registered trademark)" manufactured by Nichiban Co., Ltd.) was bonded to a mat board to prepare a reference sample, and the lightness L, and the chromaticities a* and b* were measured with a spectrophotometric colorimeter (product name "CM-5", manufactured by Konica Minolta, Inc.). The CIE 1976 Lab color difference model was used in the measurement.

A pressure-sensitive adhesive tape (trade name "Cellotape (registered trademark)" manufactured by Nichiban Co., Ltd.) was bonded on a surface of the roughened plated sheet obtained in each of Examples 1, 4, 6 to 8, 10, 11, 13, 14, 18 to 24 and 27 to 37, on which the roughened plated layer was formed, so that a range of a width of 24 mm and a length of 50 mm was achieved, and thereafter a peeling test by the pressure-sensitive adhesive tape bonded was performed in manner of a peeling off test method described in JIS H 8504. The pressure-sensitive adhesive tape after the peeling test was bonded to the same mat board as that of the reference sample, and the lightness L*, and the chromaticities a* and b* were measured with a spectrophotometric colorimeter in the same manner as described above. The difference $\Delta E^*ab$ ($\Delta E^*ab=[(\Delta L^*)^2+(\Delta a^*)^2+(\Delta b^*)^2]^{1/2}$) was calculated from the measurement results of the lightness L, and the chromaticities a* and b* of the reference sample, measured in advance, and the measurement results of the lightness L, and the chromaticities a* and b* of the pressure-sensitive adhesive tape after the peeling test, and the adhesiveness of the roughened plated layer was evaluated based on the following criteria. It can be determined that, as the $\Delta E^*ab$ is small, the amount of peeling in the peeling test is smaller, in other words, the percentage of the roughened nickel layer remaining after the peeling test is higher and adhesiveness to a substrate is more excellent.

REFERENCE SIGNS LIST

1 . . . roughened plated sheet
11 . . . metal substrate
12 . . . roughened plated layer
121 . . . roughened nickel plated layer
1210 . . . nickel particulate material
122 . . . zinc plated layer
1220 . . . zinc plated film

The invention claimed is:

1. A roughened plated sheet comprising a roughened plated layer having a roughened nickel plated layer and a zinc plated layer formed on at least one surface of a metal substrate in this order from the metal substrate side, wherein
a ten-point average roughness $Rz_{jis}$ of a surface of the roughened plated layer, according to laser microscope measurement, is 3 μm or more; and
a lightness L* of a surface of a roughened plated layer is 45 to 83.

2. The roughened plated sheet according to claim 1, wherein a ten-point average roughness $Rz_{jis}$ of a surface of the roughened plated layer is 3 to 30 μm.

3. The roughened plated sheet according to claim 1, further comprising another plated layer between the metal substrate and the roughened nickel plated layer.

4. The roughened plated sheet according to claim 3, wherein the another plated layer is a nickel plated layer or a zinc plated layer.

5. The roughened plated sheet according to claim 1, wherein an adhesion amount of the zinc plated layer forming the roughened plated layer is 3 g/m² or more.

6. The roughened plated sheet according to claim 1, wherein the metal substrate is a metal sheet or metal foil comprising one pure metal selected from Fe, Cu, Al and Ni, or a metal sheet or metal foil comprising an alloy comprising one selected from Fe, Cu, Al and Ni.

* * * * *